United States Patent
Attiogbe

(10) Patent No.: US 10,730,794 B1
(45) Date of Patent: Aug. 4, 2020

(54) METHOD OF DELIVERY OF DRY POLYMERIC MICROSPHERE POWDERS FOR PROTECTING CONCRETE FROM FREEZE-THAW DAMAGE

(71) Applicant: Emmanuel Attiogbe, DIscovery Bay, CA (US)

(72) Inventor: Emmanuel Attiogbe, DIscovery Bay, CA (US)

(73) Assignee: CEM INNOVATIONS, LLC, Discovery Bay, CA (US)

( * ) Notice: Subject to any disclaimer, the term of this patent is extended or adjusted under 35 U.S.C. 154(b) by 0 days.

(21) Appl. No.: 16/589,016

(22) Filed: Sep. 30, 2019

(51) Int. Cl.
| | |
|---|---|
| *C04B 18/02* | (2006.01) |
| *C04B 16/08* | (2006.01) |
| *C04B 18/08* | (2006.01) |
| *C04B 18/14* | (2006.01) |
| *C04B 28/04* | (2006.01) |
| *C04B 28/06* | (2006.01) |
| *C04B 28/10* | (2006.01) |
| *C04B 14/28* | (2006.01) |
| *C04B 14/10* | (2006.01) |
| *C04B 20/00* | (2006.01) |
| *C04B 28/08* | (2006.01) |
| *C04B 111/20* | (2006.01) |

(52) U.S. Cl.
CPC ......... *C04B 18/021* (2013.01); *C04B 14/106* (2013.01); *C04B 14/28* (2013.01); *C04B 16/082* (2013.01); *C04B 18/08* (2013.01); *C04B 18/146* (2013.01); *C04B 20/0036* (2013.01); *C04B 28/04* (2013.01); *C04B 28/065* (2013.01); *C04B 28/08* (2013.01); *C04B 28/10* (2013.01); *C04B 2111/29* (2013.01); *C04B 2235/5436* (2013.01)

(58) Field of Classification Search
CPC ..... C04B 18/021; C04B 14/106; C04B 14/28; C04B 16/082; C04B 18/08; C04B 18/146; C04B 20/0036; C04B 28/04; C04B 28/065; C04B 28/08; C04B 28/10; C04B 2111/29; C04B 2235/5436
USPC ............................................................ 524/5
See application file for complete search history.

(56) References Cited

U.S. PATENT DOCUMENTS

2005/0274294 A1* 12/2005 Brower ................... C04B 28/02
106/802

* cited by examiner

*Primary Examiner* — Hui H Chin
(74) *Attorney, Agent, or Firm* — Michael L. Greenberg, Esq.; Greenberg & Lieberman, LLC

(57) ABSTRACT

A method of delivering polymeric microspheres to protect a cementitious composition, such as concrete, from freeze-thaw damage which comprises the addition of a dry blend of mineral powder and dry-expanded polymeric microspheres to cementitious compositions is described. The polymeric microspheres form annulus voids in the cementitious matrix by undergoing thermal contraction as the ambient temperature drops. The annulus voids act as entrained air voids to provide spaces for ice crystals to grow, thereby greatly reducing or eliminating the risk of cracking of the cementitious composition during freezing and thawing.

7 Claims, 5 Drawing Sheets

METHOD OF DELIVERY OF DRY POLYMERIC MICROSPHERE POWDERS FOR PROTECTING CONCRETE FROM FREEZE-THAW DAMAGE

FIELD OF THE PRESENT INVENTION

The present invention relates to the field of construction compounds, and more specifically relates to a new system by which cementitious compositions such as concrete are mixed with dry polymeric microspheres to ensure the end product remains durable through freeze-thaw conditions.

BACKGROUND OF THE PRESENT INVENTION

Air entrainment is an effective means for producing a freeze-thaw durable cementitious composition, such as concrete. The air voids provide spaces for ice crystals to grow thereby relieving internal tensile stresses that can cause cracking of the cementitious composition. In the plastic state of the cementitious composition, air bubbles are entrained by the action of mixing the ingredients and are stabilized by using a surfactant or an air-entraining agent. Therefore, the amount of stable air entrained in cementitious compositions can only be indirectly controlled through the amount or type of air-entraining agent added to the cementitious mixture. If air bubbles of acceptable spacing are not entrained by the mixing action, then the air-entraining agent will be ineffective in supporting the generation of an acceptable air-void structure in the hardened cementitious composition.

Uncertainties in air-void stability and difficulties in achieving consistent spacing of the voids occur quite often in the production of air-entrained cementitious composition, resulting in high production costs for air-entrained concrete. Hence, it is desirable to have an alternative to air entrainment in which void structures are incorporated into cementitious compositions without requiring air bubbles to be stabilized during mixing. This has led to the development of technologies such as those which comprise hollow-core polymeric microspheres as an alternative to air entrainment.

The hollow-core polymeric microspheres are characterized by inner deformable spaces and outer solid shells. The inner spaces of these microspheres are filled with a liquid or a gas, which enables the microspheres to contract and create voids in the concrete when the ambient temperature drops. The expandable microspheres are commercially available under a variety of trade names, such as Expancel®, and use a variety of polymeric materials to form the wall of the microsphere.

The polymeric microspheres that protect concrete from freeze-thaw damage are produced as gas-filled wet-expanded microspheres in a wet foam or slurry form or as gas-filled dry-expanded microspheres in dry powder form. The expanded microspheres have very low densities and they agglomerate in dry powder form. This particle agglomeration is detrimental to performance because the microspheres must be uniformly dispersed throughout the cementitious composition to be effective in protecting the cementitious composition from freeze-thaw damage at a relatively low quantity. The powder form is also difficult to handle as it causes dusting. Therefore, it would be preferred to use the wet-expanded microspheres in slurry form in cementitious compositions. However, the slurry is best produced at the point of addition into the cementitious composition to avoid separation of the very low-density microspheres from the liquid medium during storage. This production limitation of the expanded microspheres in slurry form leads to high production and logistics costs that have stifled introduction of the microsphere technology into practice. A suitable method of delivery of the expanded microspheres in dry powder form into cementitious compositions that eliminates or minimizes particle agglomeration and eases handling of the powder would facilitate introduction of the technology into practice.

No references are found in the prior art which facilitate the use of the technology of the present invention in dry powder form. For example, U.S. Pat. No. 7,435,766B2, by Ong, published on Oct. 14, 2008 is for a Method of delivery of agents providing freezing and thawing resistance to cementitious compositions. Ong teaches the use of microspheres, but the amounts employed vary from that taught by the present invention. Additionally, and most importantly, liquid delivery is used. In contrast, the present invention teaches the use of powder (dry) delivery with a precise mixture/proportion of mineral powders to ensure that the microspheres do not adhere to one another and help to establish a more even dispersion of the microspheres.

Methods of delivery of microspheres developed to date to achieve uniform dispersion in concrete typically involve dispensing the microspheres in some type of liquid. But these have proven to be very costly to implement in practice. To date, the microsphere technology has not been introduced into practice because of the lack of the means by which it can be cost-effectively dispensed into concrete. In contrast, the present invention teaches a means by which microspheres may be cost-effectively dispensed into concrete in a dry powder form such that they are evenly dispersed and effective, unlike the methods found in the prior art.

The invention described herein provides a method to facilitate delivery of dry-expanded polymeric microspheres into a cementitious composition and promote uniform dispersion of the microspheres throughout the cementitious composition.

SUMMARY OF THE PRESENT INVENTION

The present invention is a method of delivering polymeric microspheres to protect a cementitious composition from freeze-thaw damage which comprises adding to the cementitious composition a dry blend of mineral powder and dry-expanded polymeric microspheres to promote uniform dispersion of the microspheres throughout the cementitious composition.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
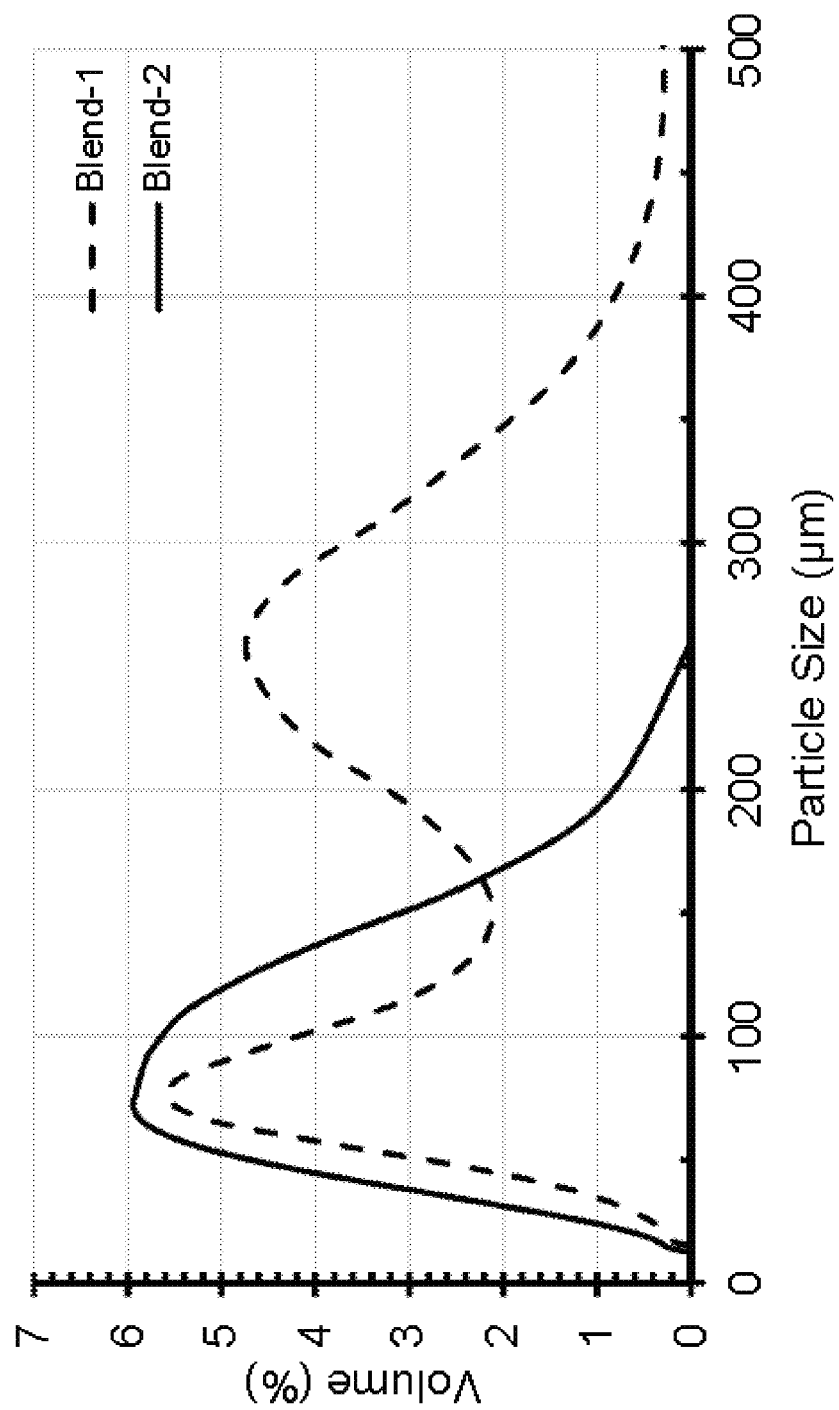
FIG. 1 depicts a view of particle size distributions for Blend-1 and Blend-2 of the present invention.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a method of delivery of expanded polymeric microspheres in dry powder form to protect a cementitious composition, such as concrete, from freeze-thaw damage which comprises the addition of a dry blend of microspheres and a mineral powder to the cementitious composition to facilitate the delivery and promote uniform dispersion of the microspheres throughout the cementitious composition. The mineral powder is comprised of at least one of calcium carbonate, metakaolin, silica fume, slag, and fly ash, or mixtures thereof.

The dry-expanded polymeric microspheres have an average diameter, which is the $D_{50}$ size, in the range of about 25 µm to about 100 µm, where $D_{50}$ is the diameter at which 50% of the mass (or volume) of a sample of the material is comprised of smaller particles. The density of the microspheres is in the range of about 20 kg/m$^3$ to about 70 kg/m$^3$. In certain embodiments, the average diameter of the dry-expanded microspheres is about 40 µm with a density of about 25 kg/m$^3$. The polymeric microspheres in dry powder form agglomerate to form larger particles. Such agglomerated particles would make it difficult to uniformly disperse the microspheres throughout the cementitious composition. A larger average size of the microsphere particles due to agglomeration implies that a higher quantity of the microspheres would be needed to achieve protection of the cementitious composition from freeze-thaw damage compared to the quantity based on the average diameter for the individual microspheres. The minimum amount of the microspheres to add to the cementitious composition by volume fraction ($A_{min}$) and achieve protection from freeze-thaw damage is expressed by equation 1.

$$A_{min} = \frac{pD_p}{1520 - D_p} \quad (1)$$

where $D_p$ is the average size of the microspheres in µm and p is the volume fraction of paste in the cementitious composition. As indicated by equation 1, the larger the average size of the microsphere particles due to agglomeration, the higher the minimum volume fraction required, which would imply a higher cost to treat a unit volume of the cementitious composition. Blending the dry-expanded microspheres with a mineral powder enables the surfaces of the microspheres to be coated, which prevents the microspheres from sticking together and agglomerating to form larger particles. The particle size of the mineral powder is in the range of about 0.1 µm to about 75 The average size of all the particles in the powder blend is the $D_{50}$ value obtained from a particle size analysis of a sample of the blend. From such a particle size analysis, uniform dispersion or lack of agglomeration of the microspheres is indicated by a particle size distribution with a single peak.

Various quantities of the mineral powder can be blended with the expanded polymeric microspheres. An adequate quantity of the mineral powder must be blended with the microspheres to minimize agglomeration of the microspheres in the powder blend. The weight percent of mineral powder in the powder blend containing the dry-expanded polymeric microspheres is in the range of about 80% to about 98% to minimize agglomeration of the microspheres.

In certain embodiments, the weight percent of calcium carbonate in the powder blend is in the range of about 85% to about 95% to minimize agglomeration of the microspheres. Dry powder blends of calcium carbonate and expanded polymeric microspheres in various proportions are commercially available under a variety of trade names, such as Prolite™, and are used in applications other than as additives to protect cementitious compositions from freeze-thaw damage, such as lightweight fillers in polymer resins for cast polymer parts.

The amount of the dry blend of mineral powder and dry-expanded polymeric microspheres to add to the cementitious composition to protect the composition from freeze-thaw damage is about 0.55% to about 6% of the total volume. The amount of expanded polymeric microspheres in the quantity of powder blend added to the cementitious composition is about 0.5% to about 2% of the total volume of the cementitious composition.

The expanded polymeric microspheres in the powder blend may be comprised of a polymer that is at least one of polyethylene, polypropylene, polystyrene, polymethyl ethacrylate, polyo-chlorostyrene, polyvinyl chloride, polyvinylidene chloride, polyacrylonitrile, polymethacrylonitrile, and copolymers thereof, such as copolymers of vinylidene chlorideacrylonitrile, polyacrylonitrile-copolymethacrylonitrile, polyvinylidene chloridepolyacrylonitrile, vinyl chloride-vinylidene chloride, or the like.

The use of the dry blend of mineral powder and dry-expanded polymeric microspheres, while eliminating the practical problems encountered in air entrainment, would also make it possible to use fly ash with high unburned carbon content as a supplementary cementitious material to reduce cement content of concrete and achieve cost savings. This low-grade fly ash is usually landfilled as it is considered unusable without further treatment because it makes air entrainment of concrete difficult or impossible.

Cementitious wet-cast mixtures are conventional concrete mixtures which are comprised of hydraulic cement, dry blend of mineral powder and dry-expanded polymeric microspheres, sand, coarse aggregate, water, and chemical admixtures such as retarders, accelerators and plasticizers, silica fume, fly ash, slag, and other pozzolanic materials, and filler materials such as lime or ground calcium carbonate. The cementitious wet-cast mixtures include poured cementitious mixtures and articles formed from cementitious mixtures. The hydraulic cement can be a portland cement, a calcium aluminate cement, a calcium sulfoaluminate cement, a magnesium phosphate cement, a magnesium potassium phosphate cement, or any other suitable hydraulic binder. Aggregate may be included in the cementitious wet-cast mixture. The aggregate can be silica, quartz, sand, crushed marble, granite, limestone, calcite, feldspar, alluvial sands, any other durable aggregate, and mixtures thereof. The dry blend of mineral powder and dry-expanded polymeric microspheres is added directly into the cementitious wet-cast mixture, or preferably added in a dissolvable or disintegrating bag to avoid direct handling of the dry powder blend.

Cementitious bagged mixtures are used to prepare mortar mixtures by adding water for applications such as repair works, installation of masonry units and preformed cementitious articles, or exterior plastering. The cementitious bagged mixtures can be comprised of hydraulic cement, masonry cement, dry blend of mineral powder and dry-expanded polymeric microspheres, sand, pozzolans such as fly ash or calcined clay, pigments, and plasticizers. The hydraulic cement can be a portland cement, a calcium aluminate cement, a calcium sulfoaluminate cement, a magnesium phosphate cement, a magnesium potassium phosphate cement, or any other suitable hydraulic binder. The masonry cement can comprise a composition to produce Type N, Type S, or Type M mortar. The sand included in the cementitious formulation can be fine aggregate that almost entirely passes through a Number 4 sieve (ASTM C125 and ASTM C33), such as silica sand. The dry blend of mineral powder and dry-expanded polymeric microspheres is mixed into the dry cementitious mixture and bagged.

Examples of the embodiments described herein were evaluated for freeze-thaw durability performance of cementitious wet-cast mixtures. Commercially available blends of calcium carbonate and dry-expanded polymeric microsphere powders under the trade name of Prolite™ were used. The particle size analysis of two different blends are shown in FIG. 1. Both blends are composed of the same expanded microspheres with an average diameter of about 40 µm and a density of about 25 kg/m³. The weight percent of calcium carbonate powder in Blend-1 is 85% and in Blend-2 is 95%. FIG. 1 shows that Blend-1 has a particle size distribution with two peaks, indicating that the blend has lumps of particles with different sizes. Blend-2 has a particle size distribution with only one peak, indicating a more uniform dispersion of particles compared to Blend-1.

Figure 2A:
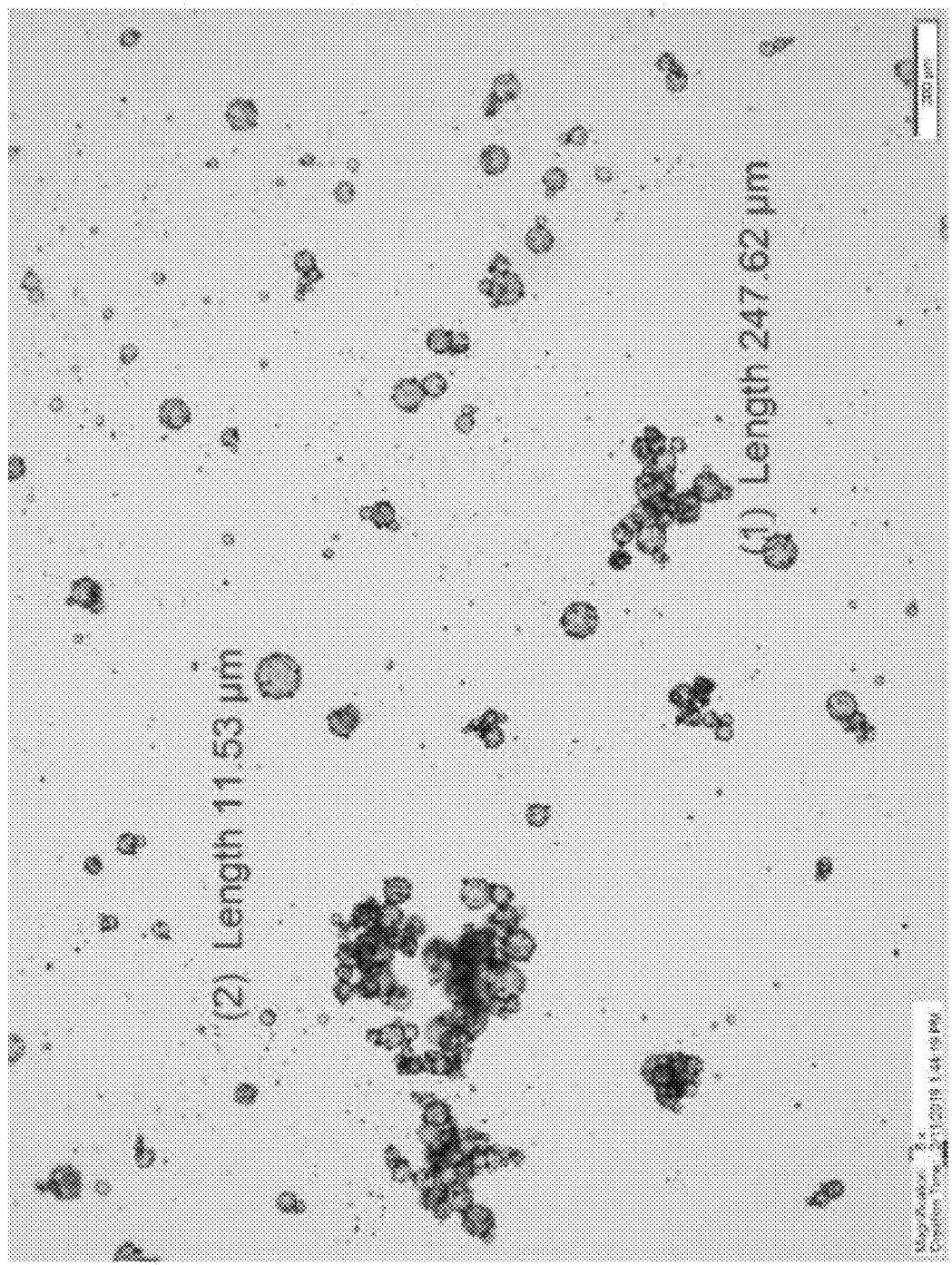
FIG. 2A exhibits a view of a Photomicrograph of Blend-1 of the present invention at 5× magnification.
Figure 2B:
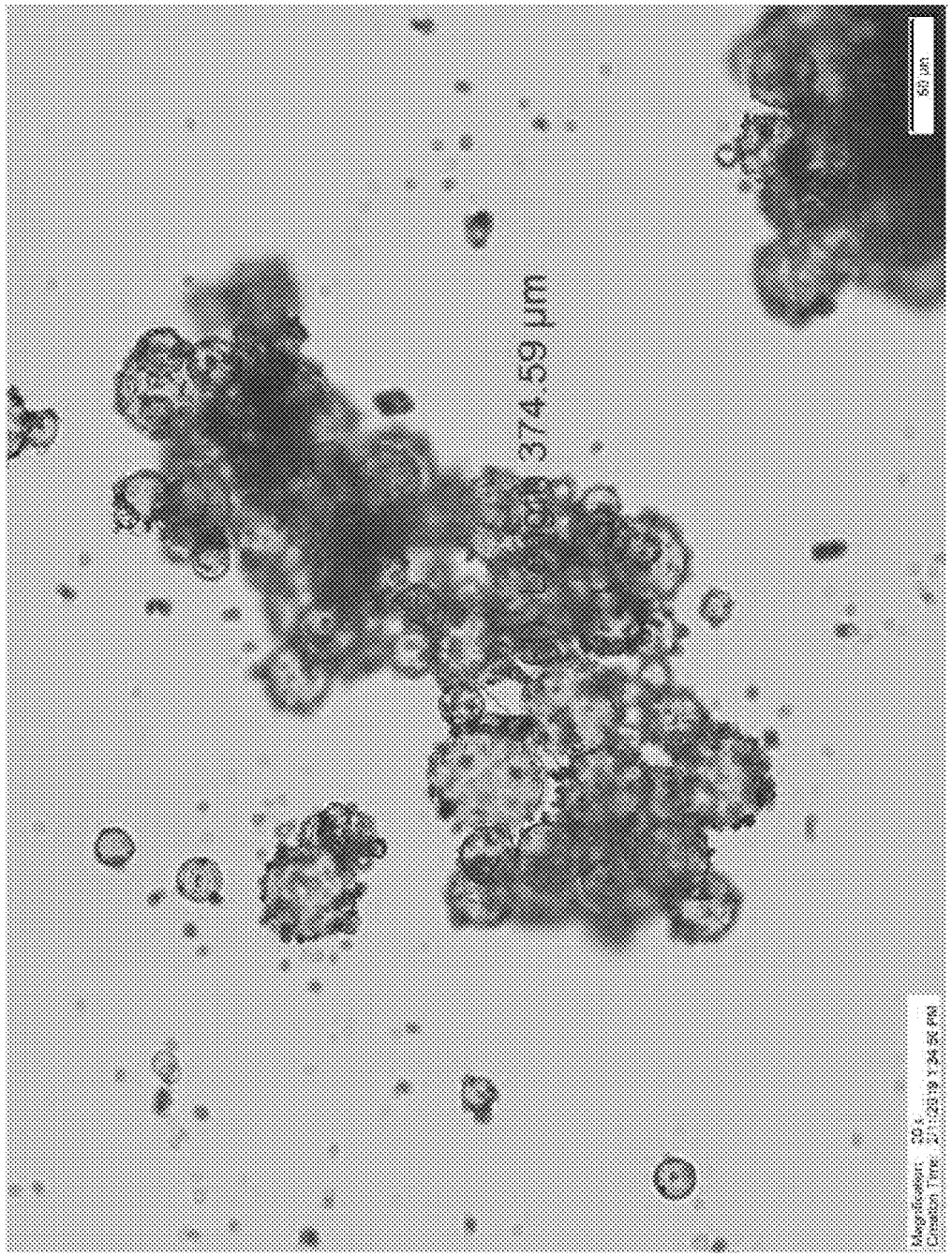
FIG. 2B displays a view of a Photomicrograph of Blend-1 of the present invention at 20× magnification.
Figure 3A:
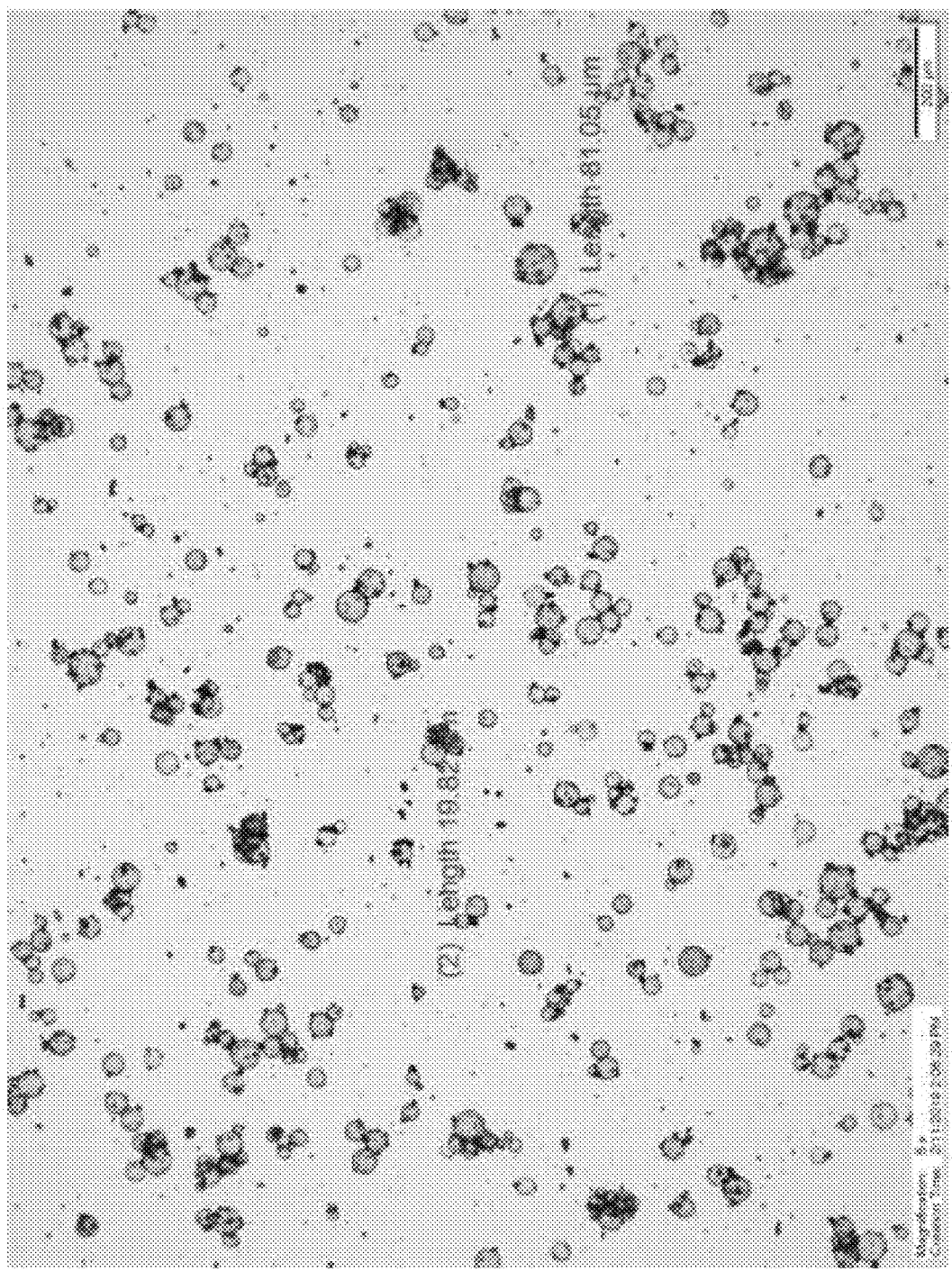
FIG. 3A shows a view of a Photomicrograph of Blend-2 of the present invention at 5× magnification.
Figure 3B:
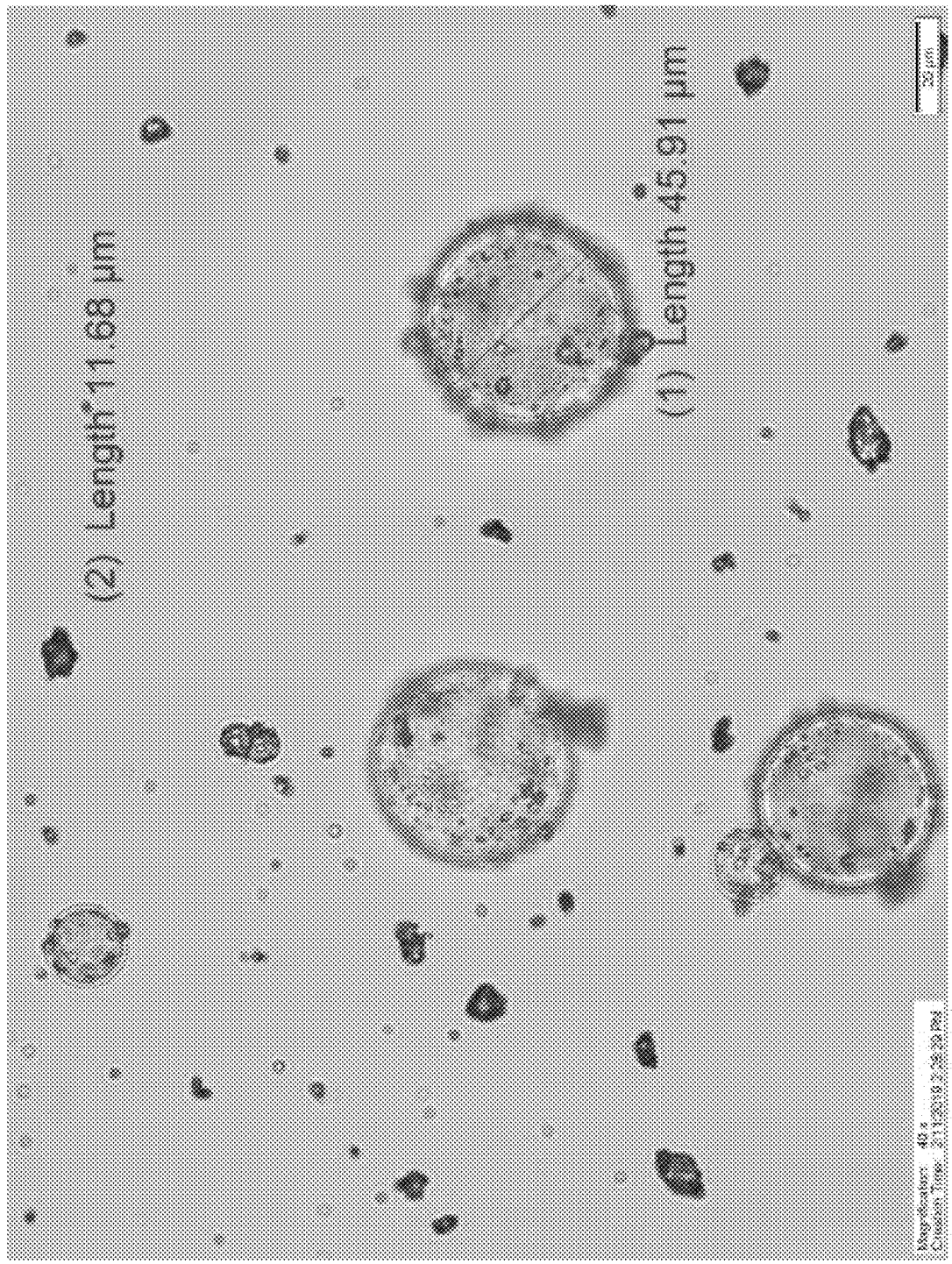
FIG. 3B shows a view of a Photomicrograph of Blend-2 of the present invention at 40× magnification.

Typical photomicrographs of the two blends are shown in FIGS. 2a and 2b for Blend-1 and FIGS. 3a and 3b for Blend-2. FIGS. 2a and 2b show significant agglomeration of the microspheres compared to FIGS. 3a and 3b which show the individual microspheres to be quite well dispersed. FIG. 1 and the photomicrographs in FIGS. 2 and 3 show that the quantity of calcium carbonate powder in Blend-1 (85% by weight) is insufficient to enable the microspheres to be dispersed uniformly. Increasing the calcium carbonate content to 95% by weight as in Blend-2 enabled the dispersion of the microspheres to be significantly improved.

The Blend-1 and Blend-2 materials were used in preparing concrete specimens using a rotary drum mixer. Non-air-entrained (Sample 1) and air-entrained (Sample 2) concrete samples were also prepared as references. For the air-entrained reference concrete, air-entraining admixture was added to achieve a target air content of 6%. No air-entraining admixture was used in the concrete mixtures containing the blend additives. Coarse aggregate, fine aggregate, water and cement were added to the mixer, with the Blend-1 or Blend-2 material being added with the cement. The blend additive was added to replace an equal volume of fine aggregate based on the proportions of the non-air-entrained concrete mixture. A high-range water-reducing admixture was used to achieve a target slump in the range of 125 to 180 mm (5 to 7 in.). Blend-1 with a specific gravity of 0.15 was added to the concrete mixture by volume percent and tested at four levels of 1.1, 1.4, 1.6 and 1.9%, which yield volume percent of microspheres in the concrete to be 1.0, 1.25, 1.5 and 1.75%, respectively (Samples 5 to 8). Blend-2 with a specific gravity of 0.25 was added to the concrete mixture by volume percent and tested at two levels of 2.0 and 2.6%, which yield volume percent of microspheres in the concrete to be 1.0 and 1.25%, respectively (Samples 3 and 4). The concrete ingredients were mixed for 3 minutes, followed by a 3-minute rest, then followed by a 2-minute final mixing. Beam specimens were cast for freeze-thaw testing in accordance with ASTM C666, Procedure A. Cylindrical specimens were cast for compressive strength testing at 28 days. Unit weight and air content were also measured for each mixture. Table 1 shows the concrete mixture proportions and the test results.

TABLE 1

| | Sample | | | | | | | |
|---|---|---|---|---|---|---|---|---|
| | 1 | 2 | 3 | 4 | 5 | 6 | 7 | 8 |
| Cement (kg/m³) | 335 | 335 | 335 | 335 | 335 | 335 | 335 | 335 |
| Coarse Agg. (kg/m³) | 1104 | 1042 | 1104 | 1104 | 1104 | 1104 | 1104 | 1104 |
| Fine Agg. (kg/m³) | 739 | 695 | 682 | 668 | 709 | 700 | 693 | 686 |
| Water (kg/m³) | 174 | 174 | 174 | 174 | 174 | 174 | 174 | 174 |
| w/c | 0.52 | 0.52 | 0.52 | 0.52 | 0.52 | 0.52 | 0.52 | 0.52 |
| AEA (mL/m³) | — | 96.2 | — | — | — | — | — | — |
| Blend-1 Microspheres (vol. % of concrete) | — | — | — | — | 1.0 | 1.25 | 1.50 | 1.75 |
| Blend-2 Microspheres (vol. % of concrete) | — | — | 1.0 | 1.25 | — | — | — | — |
| Water Reducer (Type F) (mL/m³) | 923 | — | 1235 | 1104 | 783 | 1350 | 1875 | 1250 |
| Slump (mm) | 156 | 138 | 138 | 138 | 138 | 144 | 156 | 144 |
| Air (vol. % of concrete) | 2.3 | 5.8 | 2.7 | 2.2 | 2.8 | 2.7 | 3.1 | 3.5 |
| Unit Weight (kg/m³) | 2336 | 2248 | 2314 | 2307 | 2323 | 2320 | 2307 | 2291 |
| 28-day Compressive Strength (MPa) | 37.3 | 33.9 | 36.6 | 35.4 | 34.5 | 31.6 | 31.4 | 31.8 |
| Freeze-Thaw Testing to 300 Cycles | | | | | | | | |
| Durability Factor (%) (must be ≥60%) | Fail | 88 | 85 | 86 | Fail | Fail | Fail | 87 |
| Relative Durability Factor (%) (must be ≥80%) | — | 100 | 97 | 98 | — | — | — | 99 |
| Scaling Rating (Freeze-Thaw Beams) | — | 0 | 0 | 0 | — | — | — | 0 |

Notes:
1 kg/m³ = 1.685 lb/yd³; 1 mL/m³ = 0.026 oz/yd³; 1 mm = 0.04 in.; 1 MPa = 145 psi.

The freeze-thaw results in Table 1 are evaluated on the basis that concrete is considered able to withstand a freezing and thawing environment when the durability factor is 60% or greater after 300 cycles of testing. Also, the durability factor of the concrete relative to that of air-entrained concrete (that is, the relative durability factor) must be 80% or greater. The results show that concrete samples containing Blend-1 passed the freeze-thaw test only at a microsphere content of 1.75% with a durability factor of 87%, whereas the samples containing Blend-2 passed the test at the two microsphere contents of 1.0 and 1.25% with durability factors of 85% and 86%, respectively. As explained with equation 1, the higher microsphere content needed for concrete containing Blend-1 to pass the freeze-thaw test compared to concrete containing Blend-2 is on account of the larger microsphere particle sizes in the Blend-1 due to microsphere agglomeration. As shown in Table 1, the performance of these concrete samples was comparable to that of the air-entrained concrete (Sample 2), with relative durability factor values of 99% at the microsphere content of 1.75% for Blend-1, and 97% and 98% at the microsphere contents of 1.0 and 1.25%, respectively, for Blend-2. As expected, the concrete sample without either air entrainment or microsphere additive (Sample 1) failed the freeze-thaw test. Using a visual surface scaling rating of 0 to 5, where 0 is no scaling and 5 is severe scaling, the results in Table 1 show that the concrete samples containing Blend-1 and Blend-2 that passed the freeze-thaw test performed similarly to the air-entrained concrete with a surface scaling rating of 0 for all samples.

It should be noted that the mineral powder may be either inert or reactive with respect to the hydration or hardening of the cement and concrete. The mineral powder (calcium carbonate) used in the commercially available blend is generally inert with respect to the concrete hardening process. Other mineral powders that can be used and are reactive with respect to the concrete hardening process are metakaolin, silica fume, slag, and fly ash. These are commonly used reactive powders in concrete to enhance the overall performance of the concrete but there is no commercially available blend with the microspheres. It is the intent of the mineral powders to prevent undesired adhesion of the microsphere particles to one another. It should be understood that both the inert and reactive mineral powders can perform well, however the primary physical property of the mineral powders which determines their efficacy is the particle size. As stated, the maximum particle size of each mineral powder must be less than 100 microns. Ideally, the smaller the average size of the mineral powder particles, the more efficient the mineral powder will be in preventing the adhesion of the microspheres to one another. For this task, calcium carbonate is the preferred mineral powder employed as it is readily available in the sizes needed (smaller than most other mineral powders) and it is abundantly available.

It should similarly be understood that there is a minimum and a maximum quantity of the mineral powders to use in the blend with the microspheres to ensure that the microspheres do not stick together. The weight percent of the mineral powder in the blend with the microspheres is in the range of 80% to 98%. The lower limit ensures that the microsphere stickiness is sufficiently reduced, and the upper limit ensures that there is a sufficient quantity of microspheres in the blend to deliver the intended performance.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method of delivering polymeric microspheres to protect a cementitious composition from freeze-thaw damage comprising:
adding to the cementitious composition a precoated microsphere powder consisting of a dry blend of calcium-containing mineral powder and dry-expanded polymeric microspheres to promote uniform dispersion of the microspheres during mixing of the cementitious composition.

2. The method of claim 1, wherein the mineral powder is comprised of at least one compound chosen from the following group: calcium carbonate, metakaolin, silica fume, slag, and fly ash, or mixtures thereof.

3. The method of claim 1, wherein the weight percent of calcium-containing mineral powder in the precoated microsphere powder is about 80% to about 98% to minimize agglomeration of the microspheres.

4. The method of claim 3, wherein uniform dispersion or lack of agglomeration of the precoated microsphere powder is indicated from a particle size analysis of the powder blend by a particle size distribution with a single peak.

5. The method of claim 1, wherein the particle sizes of the calcium-containing mineral powder in the precoated microsphere powder are in the range of about 0.1 μm to about 75 μm.

6. The method of claim 1, wherein the amount of the precoated microsphere powder to add to the cementitious composition is about 0.55% to about 6% of the total volume.

7. The method of claim 1, wherein the precoated microsphere powder blend is added directly to the cementitious composition or added in a sack that dissolves or disintegrates during mixing of the cementitious composition.

* * * * *